United States Patent
Green et al.

(10) Patent No.: US 9,720,688 B1
(45) Date of Patent: Aug. 1, 2017

(54) EXTENSIBLE CHANGE SET CONFLICT AND MERGE GAP DETECTION

(71) Applicant: International Business Machines Corporation, Armonk, NY (US)

(72) Inventors: Ian Green, Edinburgh (GB); Gary M. Johnston, Research Triangle Park, NC (US); Adam R. Neal, Kanata, CA (US); Dominic H. Tulley, Edinburg (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/005,186

(22) Filed: Jan. 25, 2016

(51) Int. Cl.
  *G06F 9/45* (2006.01)
  *G06F 9/44* (2006.01)

(52) U.S. Cl.
  CPC .................................. *G06F 8/71* (2013.01)

(58) Field of Classification Search
  CPC ........................................................ G06F 8/71
  See application file for complete search history.

(56) References Cited

U.S. PATENT DOCUMENTS

| | | | | |
|---|---|---|---|---|
| 5,339,435 A | * | 8/1994 | Lubkin | G06F 8/71 709/220 |
| 5,974,428 A | * | 10/1999 | Gerard | G06F 8/71 707/695 |
| 6,536,037 B1 | * | 3/2003 | Guheen | G06F 8/71 703/2 |
| 7,849,443 B2 | | 12/2010 | Clemm et al. | |
| 8,266,588 B2 | * | 9/2012 | Abdelhadi | G06F 8/71 717/107 |
| 8,359,571 B2 | * | 1/2013 | Clemm | G06F 8/71 717/120 |
| 8,429,610 B2 | | 4/2013 | Clemm et al. | |
| 8,495,100 B2 | * | 7/2013 | Cheung | G06F 8/71 707/755 |
| 8,954,928 B2 | | 2/2015 | Clemm et al. | |
| 9,021,471 B2 | * | 4/2015 | DeLuca | G06F 8/71 717/120 |
| 9,141,378 B2 | * | 9/2015 | Fox | G06F 8/70 |
| 2002/0100017 A1 | * | 7/2002 | Grier | G06F 8/54 717/120 |
| 2003/0005093 A1 | * | 1/2003 | Deboer | G06F 8/71 709/220 |

(Continued)

OTHER PUBLICATIONS

Stephen A. MacKay, "Change Sets Revisited and Configuration Management of Complex Documents", Software Configuration Managment, Jun. 2005, 5 pages.

*Primary Examiner* — Matthew Brophy
(74) *Attorney, Agent, or Firm* — Cantor Colburn LLP

(57) ABSTRACT

Aspects include extensible change set conflict and merge gap detection in a record-based configuration management system. A method includes instructing the record-based configuration management system to create a change set. The method also includes instructing the record-based configuration management system to add one or more version mappings to a given configuration and to indicate specific concepts which should be flagged as not participating in a process that includes change set conflict and merge gap detection. The record-based configuration management system is instructed to deliver the change set to a requestor.

9 Claims, 12 Drawing Sheets

(56) References Cited

U.S. PATENT DOCUMENTS

| | | | |
|---|---|---|---|
| 2003/0084425 A1* | 5/2003 | Glaser | G06F 8/433 717/110 |
| 2003/0120678 A1* | 6/2003 | Hill | G06F 8/71 |
| 2003/0121024 A1* | 6/2003 | Hill | G06F 8/71 717/107 |
| 2004/0031027 A1* | 2/2004 | Hiltgen | G06F 8/65 717/170 |
| 2004/0168153 A1* | 8/2004 | Marvin | G06F 8/71 717/120 |
| 2005/0204367 A1* | 9/2005 | Minium | G06F 9/541 719/328 |
| 2005/0235012 A1* | 10/2005 | Harry | G06F 8/71 |
| 2006/0010425 A1* | 1/2006 | Willadsen | G06F 8/71 717/120 |
| 2006/0015850 A1* | 1/2006 | Poole | G06F 8/71 717/120 |
| 2006/0064685 A1* | 3/2006 | DeFolo | G06F 8/71 717/169 |
| 2007/0143752 A1* | 6/2007 | Clemm | G06F 8/71 717/178 |
| 2008/0104581 A1* | 5/2008 | Clemm | G06F 8/71 717/162 |
| 2008/0178167 A1* | 7/2008 | Sriram | G06F 8/68 717/169 |
| 2008/0178168 A1* | 7/2008 | Sriram | G06F 8/68 717/169 |
| 2008/0178173 A1* | 7/2008 | Sriram | G06F 8/61 717/176 |
| 2009/0216714 A1* | 8/2009 | Gonzalez | G06F 11/0709 |
| 2010/0100970 A1* | 4/2010 | Roy-Chowdhury | G06F 8/71 726/30 |
| 2010/0131940 A1* | 5/2010 | Jazdzewski | G06F 8/71 717/170 |
| 2010/0169865 A1* | 7/2010 | Clemm | G06F 8/71 717/121 |
| 2010/0218031 A1* | 8/2010 | Agarwal | G06F 11/079 714/2 |
| 2013/0326480 A1* | 12/2013 | Clemm | G06F 8/71 717/122 |
| 2014/0007068 A1* | 1/2014 | Cullen | G06F 8/65 717/169 |
| 2014/0143756 A1* | 5/2014 | Liang | G06F 8/70 717/120 |
| 2014/0215436 A1* | 7/2014 | Deluca | G06F 8/71 717/121 |
| 2014/0282459 A1* | 9/2014 | Hey | G06F 8/65 717/168 |
| 2015/0095876 A1* | 4/2015 | Novak | G06Q 10/101 717/102 |
| 2015/0106790 A1* | 4/2015 | Bigwood | G06F 11/3624 717/127 |
| 2015/0193231 A1 | 7/2015 | Deluca et al. | |
| 2015/0268939 A1* | 9/2015 | Kelapure | G06F 8/40 717/112 |
| 2016/0034271 A1* | 2/2016 | Amano | G06F 8/71 717/101 |

* cited by examiner

Container C    402
   └ Artifact A1    404

Container C    402
   ├ Artifact A1    404
   └ Artifact A2    502

VersionMapping    900
    configuration: Configuration    902
    concept: String    904
    version: String    906
    ChangeSet: ChangeSet    908
    ignored: Boolean    910
    previousVersion: Version    912

ChangeSet    1000
    id: String    1002
    name: String    1004
    parentStream: Configuration    1006
    dependents: ChangeSet    1008
    creationTime: Timestamp    1010
    dependenciesComputed: Boolean    1012

1100

EXTENSIBLE CHANGE SET CONFLICT AND MERGE GAP DETECTION

BACKGROUND

The present invention relates generally to configuration management systems, and more specifically, to extensible change set conflict and merge gap detection in a record-based configuration management system.

A challenge facing contemporary domain tools that use configuration management systems is how to hide internally managed resources, which need to be included in the delivery process, from the user. In simple cases like source code development, this is usually not an issue as there are typically no internal artifacts being saved in change sets that are being propagated.

Property or configuration files can constitute internal files, and the typical practice is to simply flag these resources as not deliverable. The property or configuration files will show up in the workspace of the user and the user can change their state, but cannot share the changes to the stream for other developers to see without explicitly changing parameters of a source control management system. This common practice is inadequate for the more general cases where domain tools want to include respective internal resources into change sets for delivery between streams, but do not want the user to be aware of potential conflicts or have the inclusion affect any merge gap calculations.

SUMMARY

According to embodiments, a method, system, and computer program product for extensible change set conflict and merge gap detection in a record-based configuration management system. A method includes instructing the record-based configuration management system to create a change set. The method also includes instructing the record-based configuration management system to add one or more version mappings to a given configuration and to indicate specific concepts which should be flagged as not participating in a process that includes change set conflict and merge gap detection. The record-based configuration management system is instructed to deliver the change set to a requestor.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
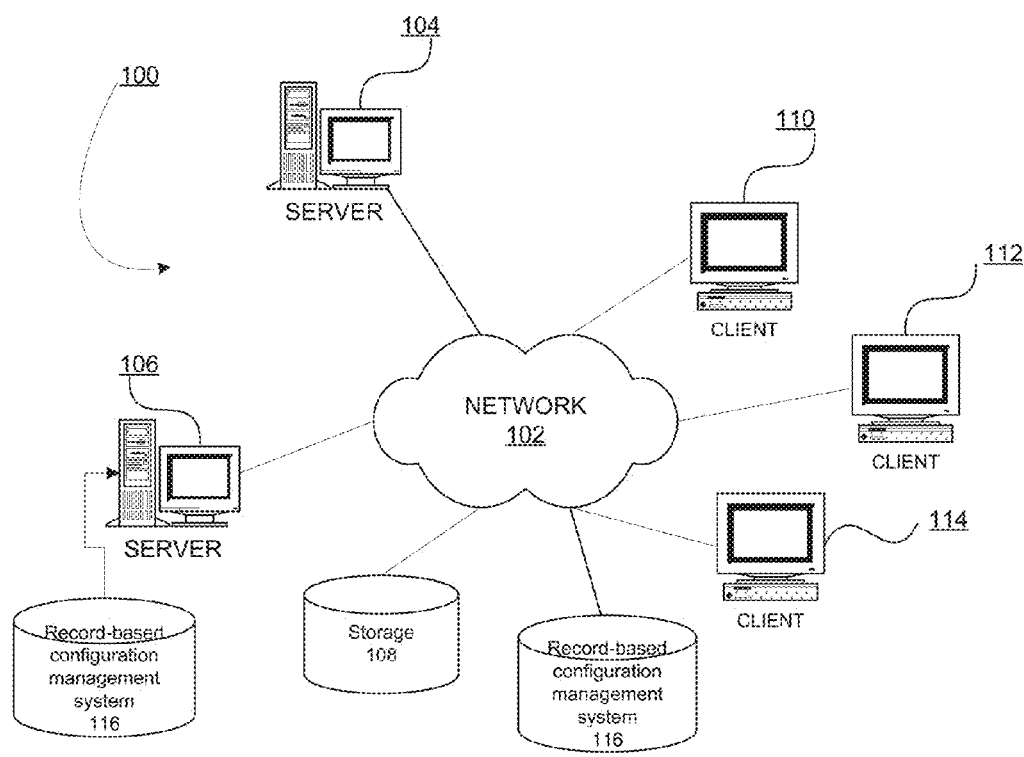
FIG. 1 is a block diagram of an exemplary network data processing system operable for various embodiments of the disclosure.

According to embodiments, extensible change set conflict and merge gap detection in a record-based configuration management system includes, in response to a creation of a new version of an artifact, indicating, by a domain tool, to the record-based configuration management system that the new version of the artifact is created. It can be determined, by the domain tool, whether a change to a particular artifact can be ignored during a process of determining whether future change sets will require this change set to be delivered. In response to a determination that the change to the particular artifact can be ignored during the determination of whether future change sets will require this change set to be delivered, embodiments set a flag to ignore. The flag is added to version mappings owned by change sets and is controlled by the domain tool which publishes changes made by a user, and allows identified version mappings to be ignored and managed by the domain tool instead. In response to a determination that the change to the particular artifact cannot be ignored during the determination of whether future change sets will require this change set to be delivered, embodiments avoid setting the flag to ignore (e.g., they may set the flag to indicate "don't ignore"). Other non-identified artifacts are considered to ensure that interdependent artifacts identified in the change set are delivered together.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
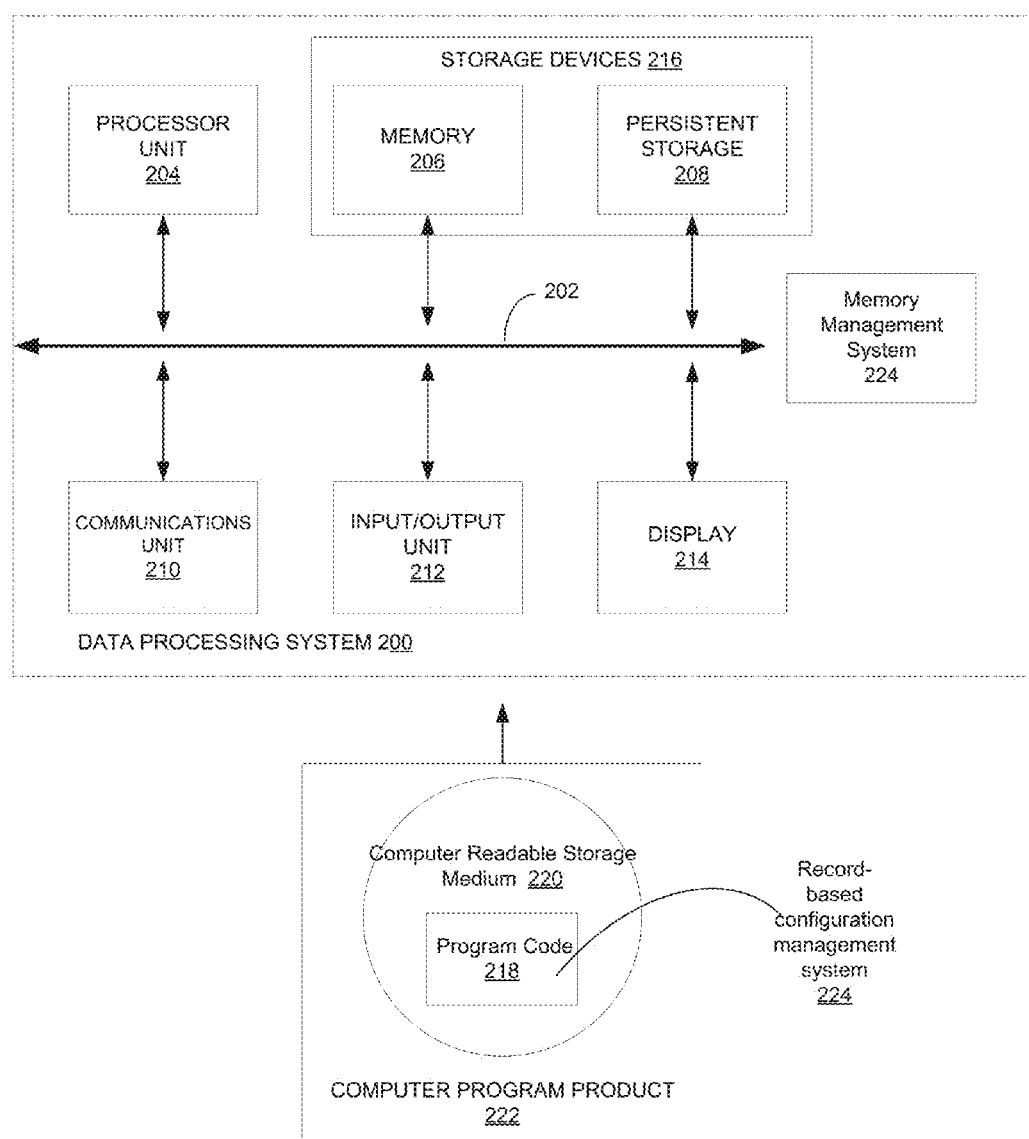
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. Enhanced configuration management system 116 may be downloadable, in the form of code suitable execution when deployed on any number of server 104 or server 106. Server 106 is also shown as having enhanced configuration management system 116 implemented at the location as an executable embodiment of the enhanced configuration management system. Enhanced configuration management system 116 is an embodiment of the disclosed system for managing change sets in an enhanced configuration management system in a data processing system, such as server 106.

In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Record-based configuration management system 224 may be downloadable, in the form of program code 218, suitable for execution when deployed on any number of data processing systems including data processing system 200. Record-based configuration management system 224 may also be in another embodiment as shown currently implemented on data processing system 200. Data processing system 200 is shown as having enhanced configuration management system 224 implemented at the location as an executable embodiment of the disclosed system for managing change sets in an enhanced configuration management system in a data processing system, such as data processing system 200.

Using data processing system 200 of FIG. 2 as an example, an apparatus for a record-based configuration management system 224 is presented. The apparatus comprises a communications fabric 202; memory 206 connected to the communications fabric, wherein the memory contains computer executable program code 218; communications unit 210 connected to the communications fabric; input/output unit 212 connected to the communications fabric; display 214 connected to the communications fabric; and processor unit 204 connected to the communications fabric.

The example of data processing system 200 is used to create an implementation of an embodiment of a computer-implemented process for extensible change set conflict and merge gap detection in a record-based configuration management system. Processor unit 204 executes program code 218 comprising instructions for an embodiment of a computer-implemented process for extensible change set conflict and merge gap detection in a record-based configuration management system, in response to a creation of a new version of an artifact, processor unit 204 indicates, by a domain tool, to the record-based configuration management system that the new version of the artifact is created. Processor unit 204 further determines, by the domain tool, whether a change to a particular artifact can be ignored during determining whether future change sets will require this change set to be delivered. In response to a determination that the change to the particular artifact can be ignored during determining whether future change sets will require this change set to be delivered, processor unit 204 sets a flag to ignore, wherein the flag added to version mappings owned by change sets is controlled by the domain tool which publishes changes made by a user, and enables identified version mappings to be ignored and managed by the domain tool instead. In response to a determination that the change to the particular artifact cannot be ignored during determining whether future change sets will require this change set to be delivered, processor unit 204 avoids setting the flag to ignore, wherein other non-identified artifacts are considered to ensure that interdependent artifacts identified in the change set are delivered together.

In general, versioning of record-based artifact management systems is not a widely addressed issue due to associated technical challenges. Most known solutions are configuration management systems for source code control, and these systems are not designed to solve this particular problem. Some configuration management systems may have a concept of dependent change sets, but these dependencies are typically based on static rules about contents of the change sets and do not provide a way for consuming domain tools to customize logic behind identifying conflicts and merge gap dependent change sets.

An embodiment of a record-based configuration management system enables extensible change set conflict and merge gap detection to exclude particular artifacts from delivery so the system can manage the delivery of artifacts. An embodiment further provides a capability for consuming tools, using a provided application-programming interface, to identify concepts in change sets, which should not be included in a user driven delivery mechanism. An embodiment further provides a capability for identifying and ignoring certain artifacts from delivery, for the system to handle, without user interaction. An embodiment therefore improves the operation of the data processing by reducing processing otherwise used to process change sets, which should not be included in a user driven delivery. An embodiment therefore improves the field of configuration management by more precisely processing change set conflict and merge gap detection to exclude particular artifacts from delivery so the system can manage the delivery of artifacts.

Figure 3:
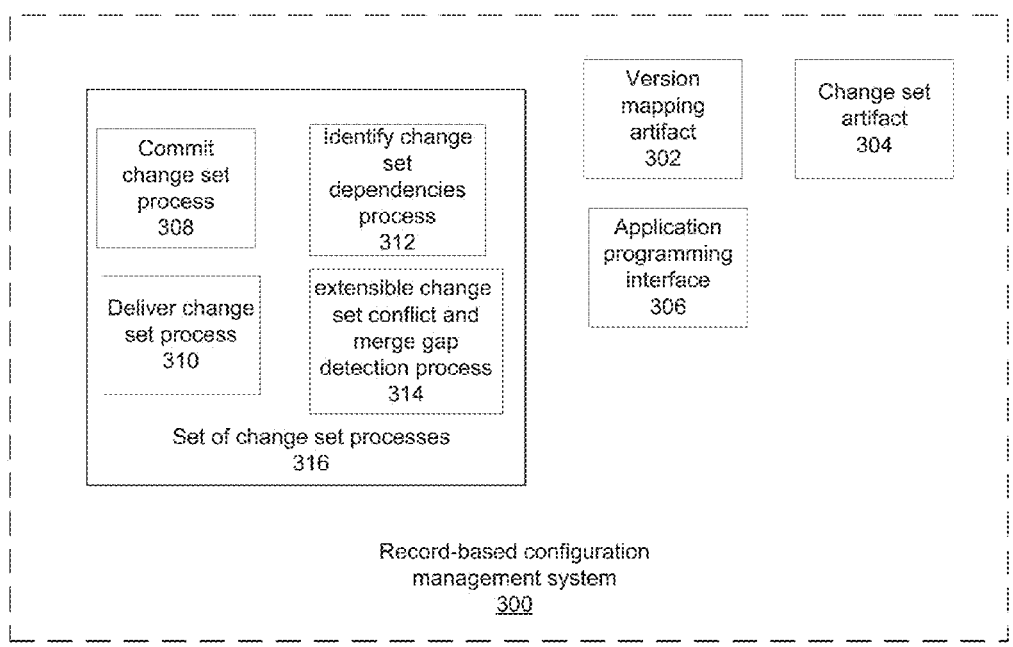
FIG. 3 is a block diagram of a record-based configuration management system operable for various embodiments of the disclosure.

With reference now to FIG. 3, a block diagram of a record-based configuration management system operable for various embodiments of the disclosure is presented. Record-based configuration management system 300 includes a set of cooperating components comprising a set of artifacts including version mapping artifact 302 and change set artifact 304; an application programming interface 306, for accessing functions within record-based configuration management system 300; and set of change set processes 316. Set of change set processes 316 includes processes comprising commit change set process 308, deliver change set process 310, identify change dependencies process 312 and extensible change set conflict and merge gap detection process 314. Further explanation of the components of record-based configuration management system 300 will be provided using examples in the following portions of this disclosure.

Figures 4, 5, 6:
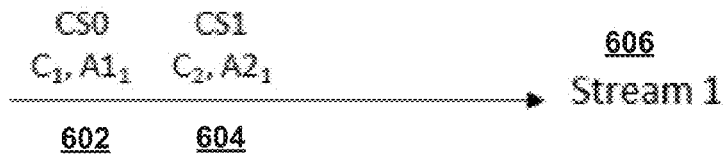
FIG. 4 is a textual representation of a container artifact with a single artifact operable for various embodiments of the disclosure.
FIG. 5 is a textual representation of a container artifact with two artifacts operable for various embodiments of the disclosure.
FIG. 6 is a textual representation of change sets and version mappings in accordance with one embodiment of the disclosure.

With reference to FIG. 4 a textual representation of a container artifact with a single artifact is presented. As an example, consider a tool which defines and manages a container artifact that represents a tree structure with nodes that reference other artifacts. Assume this tool is not using a file system to organize containment, but rather is using a record-based management system (for example, a relational database or NoSQL database). The tool creates an artifact, which contains data about the structure of the container and the contents. For illustration consider a simple tree structure as shown in FIG. 4, wherein Container 402 contains artifact A1 404.

With reference to FIG. 5 a textual representation of a container artifact with two artifacts is presented. Upon addition of another artifact, artifact A2 502, there are two resource changes made into the system, and added to a change set. Artifact A2 502 is created and container 402 is modified to say artifact A2 502 exists after artifact A1 404.

With reference to FIG. 6 a textual representation of change sets and version mappings is presented. Looking at the change sets created in the system, due to addition of artifact A2 502 yields a result as shown in FIG. 6. Change set CS0 602 represents a fact that container 402 and artifact A1 404 were created, and are represented as version 1 of each artifact. Later change set CS1 604 is created which adds the initial version of artifact A2 502 and creates a new version (state) of container 402 which indicates both artifact A1 404 and artifact A2 502 are children, and retains their respective order in Stream 1 606.

A container resource will typically be changed frequently in cases like this example. From the perspective of a user, the user only added artifact A2 502 in change set CS1 602, and may not be aware of the fact that a domain tool has also modified container 402 to accommodate such an action.

Figure 7:
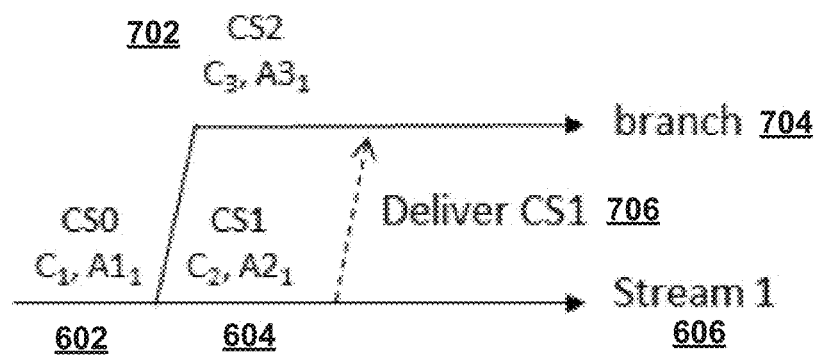
FIG. 7 is a textual representation of change sets in a parallel development scenario with a merge in accordance with one embodiment of the disclosure.

With reference to FIG. 7 a textual representation of change sets in a parallel development scenario with a merge is presented. Continuing with the previous example, assume on a parallel stream another user has added another artifact A3 to the container 402, and the changes are to be merged. Using a general strategy of identifying merge conflicts would result in CS1 604 and CS2 702 being in conflict because both change sets affect the container 402. However to provide a user experience that will not result in a conflict the domain tool knows how to resolve a conflict appropriately without requiring user input. Furthermore, the domain tool has input into a process used to determine which change sets are dependent when considering to deliver CS1 706 between the streams of Stream 1 606 and the branch 704.

Figure 8:
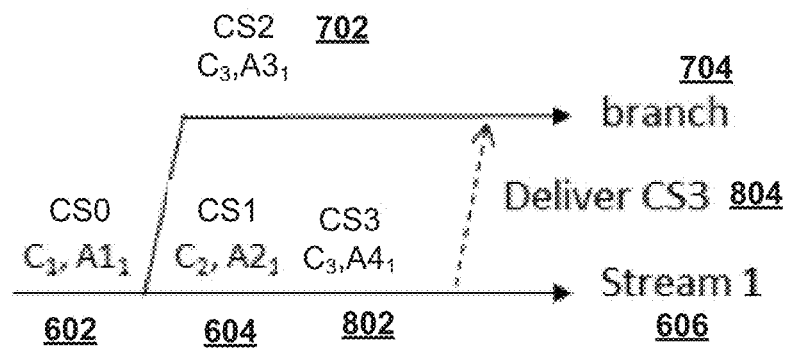
FIG. 8 is a textual representation of change sets in a parallel development scenario with a merge in accordance with one embodiment of the disclosure.

With reference to FIG. 8 a textual representation of a complex delivery scenario is presented. FIG. 8 represents the following actions by the user: CS0 602: the user added artifact A1 404 to container 402. Container 402 is modified to reflect a change in structure. CS1 604: The user added artifact A2 502 to container 402. CS3 802: The user added artifact A4 to container 402 in the context of stream 1 606. CS2 702: on a branch 704 of stream 1 606, where CS0 602 is implicitly included in the history, the user creates artifact A3 in container 402. The user attempts to deliver 804 CS3 802 from stream 1 606 into the branch 704.

A typical configuration management process would identify CS1 604 as a required change set for delivery because CS3 802 was created after CS1 604 and both change sets reference container 402, and CS1 604 is not considered part of branch 704. The typical configuration management process would also identify CS3 802 and CS2 702 in conflict because they both change container 402.

Therefore what is desired is to provide a capability in which CS3 802 can be delivered independently of CS2 702 and with no conflict identified, allowing the delivery of CS3 806 to happen without further user interaction. Taking this one step further, if CS3 802 was delivered to an independent stream that does not contain CS0 602, there is a need to provide an ability for domain tools to indicate that CS0 602 can be included as a dependent change set, while ignoring CS1 604, to maintain data integrity. To expand on this example, consider when a tool initially creates an artifact A, the tool also creates an artifact B as well, which is again another internal artifact of the domain tool, which identifies the placement of artifact A in other parts of the system. Without artifact B, the tool knows artifact A exists because of container 402, but the tool does not have information stored in artifact B required to explain how and where to display artifact A. In this case, the domain tool needs the flexibility to indicate that CS3 802 is not dependent on CS1 604, but does still require a dependency on CS0 602, as this is where the artifact B was created.

In one form of a configuration management system referred to as Version, Variants and Configurations (VVC) management is performed using version controls record-based artifacts and an ability to manage changes using change sets is provided. However this form of configuration management system does not provide any ability for domain tools to control which artifacts can be ignored when considering conflict detection and dependent change sets for merge gap detection. Other file based source control management systems including Concurrent Versioning System (CVS), also do not provide an ability for domain tools to customize which files play a part in conflict detection or change set dependencies for merge gap detection.

Figures 9, 10, 11:
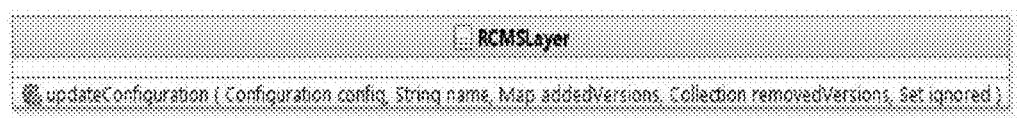
FIG. 9 is a tabular representation of a Version Mapping artifact in accordance with one embodiment of the disclosure.
FIG. 10 is a tabular representation of a ChangeSet artifact in accordance with one embodiment of the disclosure.
FIG. 11 is a tabular representation of an example of an application-programming interface operable for various embodiments of the disclosure.

With reference to FIG. 9 a tabular representation of a Version Mapping artifact operable for various embodiments of the disclosure is presented. For brevity, only the attributes relevant to this disclosure are defined. In other embodiments of the configuration management system disclosed additional attributes will typically be required. However to support a functioning configuration management system in an embodiment of the current invention a set of artifacts is defined. Each of these artifacts can be realized as a database table, in which attributes of the artifact are columns in the table. Each row therefore constitutes an instance of the respective artifact. Other forms of data structures may be used without limitation, however database tables are used in discussion of the artifacts in examples of an embodiment of the invention presented herewith.

By adding a meta-property to version mapping artifacts in the system, domain tools are enabled to communicate with the configuration management system about particular artifacts identified in a change set which can be ignored during dependency and conflict detection when considering future change sets. Annotating the version mappings with this additional meta-data enables flexibility on how artifacts are treated during conflict and merge gap detection.

When the domain tool indicates to the configuration management system that a new version of an artifact is created, the domain tool can indicate whether the change to a particular artifact can be ignored by future change sets. In the case of artifact creation, a domain tool may choose to not indicate the flag to ignore the resource by future change sets since there are other interdependent artifacts, which need to be delivered. However in future change sets the domain tool can indicate that the particular version mappings can be ignored from conflict detection. In this way the user can create CS0 602, CS1 604, and CS3 802 of FIG. 8 and have CS3 802 not depend on CS1 604 but still depend on CS0 602.

The flag that is added to the version mappings owned by change sets is controlled by the domain tool which is publishing the changes made by the user, which in turn enables a delivery process to ignore certain version mappings that should be managed by the domain tool instead.

The following are properties of an artifact Version Mapping 900 including: configuration 902: defines the stream in which this version mapping is a part; concept 904: is a unique identifier for a conceptual artifact (e.g. A1); version 906: is a unique identifier for a revision of the conceptual artifact; changeSet 908: is a reference to a change set of which it is a part; ignored 910: has a value of false when future change sets identifying the same concept should consider this change set as dependent or possibly in conflict and true otherwise; previous Version 912: is a reference to a previous version mapping in the stream for the same concept.

With reference to FIG. 10 a tabular representation of a ChangeSet artifact operable for various embodiments of the disclosure is presented. The ChangeSet 1000 is an artifact defined to have the following properties, at least: id 1002: is a unique identifier for the change set; name 1004: is a user definable name; parentStream 1006: is a stream in which the change set was created; dependents 1008 (set): are merge gap dependent change sets, which is a set of values, for example expressed as ChangeSet (0, *); creationTime 1010: is a time stamp of the change set and respective version mappings that represent when the change set was committed into the system; dependenciesComputed 1012: is a flag to denote whether the merge gap dependencies have been computed yet and the flag enables a determination of whether the merge gap dependencies have been computed yet asynchronously.

With reference to FIG. 11 a tabular representation of an application-programming interface operable for various embodiments of the disclosure is presented. In a record-based configuration management system (RCMS), the domain tool is required to notify the RCMS when there is a change to the content of a stream. This operation of record-based configuration management system is unlike a typical source control management systems, which simply relies on reading and writing the contents of the file system. Application-programming interface 1100 is an example of an application-programming interface used to communicate with the record-based configuration management system. Using the example interface, a consuming tool calls 'update-Configuration' in the RCMS providing parameters of: Configuration config: an identifier of a configuration that is being updated by the user (for example, an update may be a stream, or a change set, or some other realization of a mutable configuration); String name: an updated name for the stream when the user is changing the name; Map addedVersions: is a map with version mapping concepts as a key (e.g. A1), and version mapping versions as an associated value (e.g. All); Collection removed Versions: is a collection of version mapping concepts which should be considered as deleted from the stream; Set ignored: is an equivalent set or subset of concepts from a key set of the added version mappings map, that should be considered as ignored.

Another technique to realize this type of application-programming interface uses a representational state transfer (REST) interface, wherein a POST is issued to the RCMS and a body of the request is defined to pass the same information as described above. There are other methods, known in the art, to provide this data.

Figure 12:
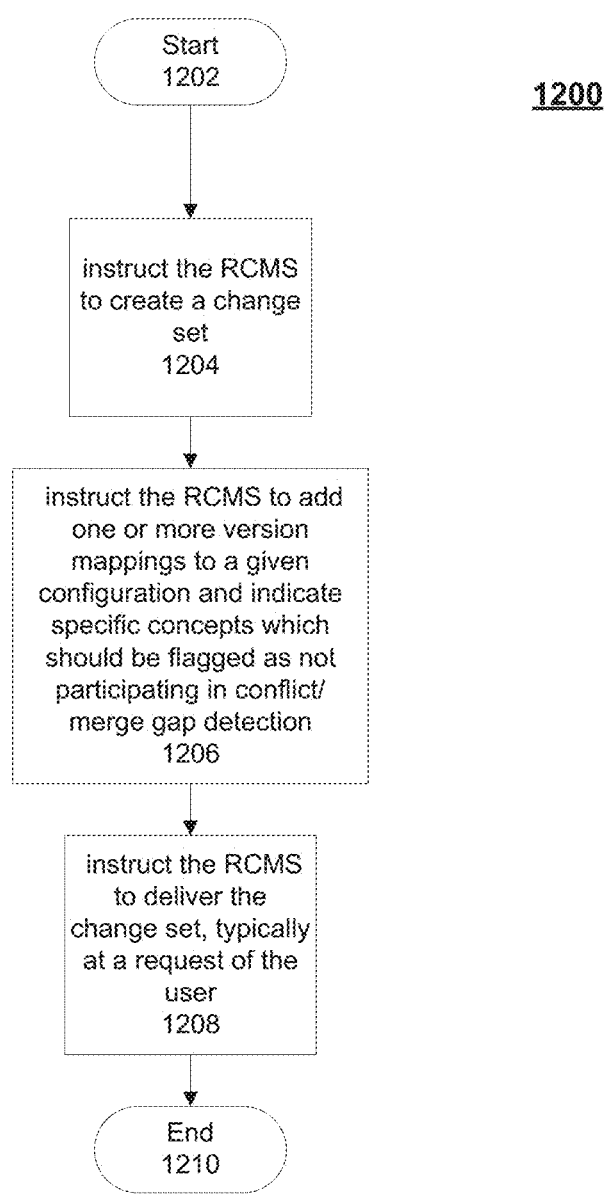
FIG. 12 is a flowchart of a process for creating and committing a change set operable for various embodiments of the disclosure.

With reference to FIG. 12 a flowchart of a process for creating and committing a change set operable for various embodiments of the disclosure is presented. Process 1200 is an example of a process of a domain tool used to create and commit the change set. Process 1200 begins (step 1202) instructs the RCMS to create a change set (step 1204). Step 1204 may be skipped and the change set can be created implicitly in a next step. Process 1200 instructs the RCMS to add one or more version mappings to a given configuration and indicate the specific concepts, which should be flagged as not participating in conflict/merge gap detection (step 1206). Process 1200 instructs the RCMS to deliver the change set, typically at the request of a user (step 1208) and terminates thereafter (step 1210).

Figure 13:
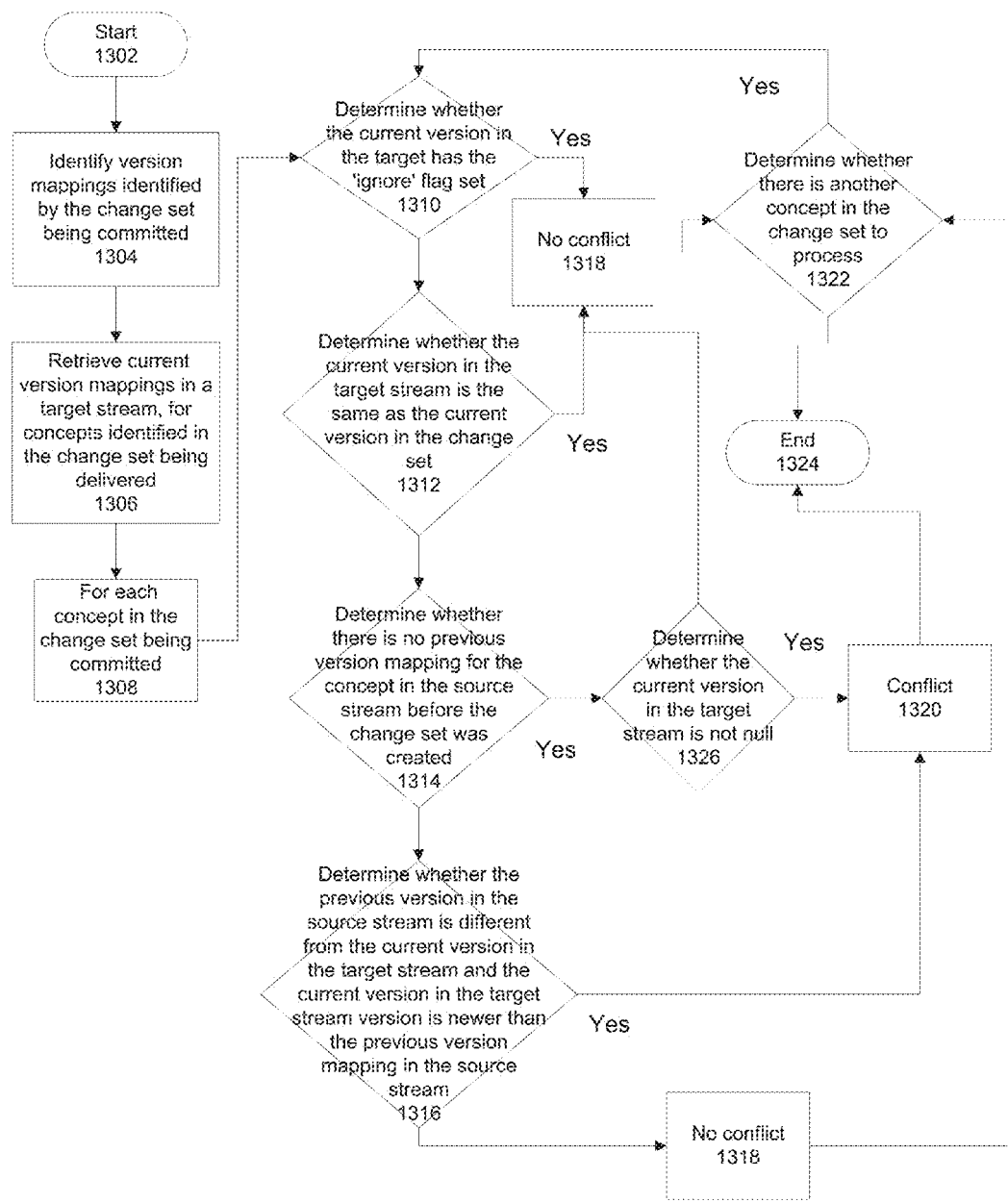
FIG. 13 a flowchart of committing a change set operable for various embodiments of the disclosure.

With reference to FIG. 13 a flowchart of committing a change set operable for various embodiments of the disclosure is presented. The process shown in FIG. 13 is an example of a process of a domain tool used in committing a change set to detect a conflict using change sets, and is specifically for a case in which a change set is created off a stream and committed back to that stream (for example, during active development). A source stream, when considering the process shown in FIG. 13, includes the change set and the stream before the change set. Whereas a target stream is everything that has happened in the stream before and after the change set was created. A conflict detection process differs depending on whether a system is committing a change set to a respective stream, or delivering a change set from one stream to another stream. In the current example, a source stream, in the case of committing a change set, is a stream in which the change set was created. In the case of delivery, the source stream is the stream that owns the change set identified to be delivered to a target stream. The target stream is a stream to which the change set will be committed. A previous version refers to version mappings that have a pointer to a respective predecessor version mapping in the same stream. If a $foo_1$ exists in stream X and the user creates $foo_2$ either directly against the stream or in a change set off of stream X, the a previous version of $foo_2$ is a pointer to the mapping for $foo_1$ in stream X. A current version implies the version mapping for a particular configuration that is considered active. This assumes that version skew (multiple versions selected for the same concept) is not supported by the configuration management system.

The process shown in FIG. 13 begins (step 1302) and identifies version mappings identified by the change set being committed (step 1304). The current version mappings in the target stream are retrieved for the concepts identified in the change set being delivered (step 1306). For each concept in the change set being committed (step 1308), the process can determine whether the current version in the target stream has the 'ignore' flag set (step 1310). When a Yes result is received, there is no conflict (step 1318) and the process determines whether there is another concept in the change set to process (step 1322) and when a Yes result is received, the process returns to step 1310, otherwise terminates thereafter (step 1324). When No is returned in step 1310, the process determines whether the current version in the target stream is the same as the current version in this change set (step 1312). When a Yes result is received, there is no conflict (step 1318) and the process determines whether there is another concept in the change set to process (step 1322) and when a Yes result is received, the process shown in FIG. 13 returns to step 1310, otherwise terminates thereafter (step 1324) as before. When a No result is received from step 1312, the process determines whether there is no previous version mapping for the concept in the source stream before the change set was created (step 1314).

In the case of committing a change set, the source stream and target stream are the same artifact until the time the change set is created. A subtlety in this case is that the version mappings will be different in the source stream versus the target stream when considering version mappings created after the time the change set was created. Therefore, the change set CS2 1404 in FIG. 14 is considered the 'source stream' and when examining a previous version in the 'source stream' what is implied is "did this concept exist before this change set was created."

Another explanation would define, in the current context of change set commit, that the source stream implies a timeline of the change set, and therefore includes any mappings created in the change set, or the stream before the change set, but does not include any version mappings created in the stream after the change set was created. Whereas a target stream includes all change sets and version mappings that were created in the stream before and after the change set in question was created, but does not include version mappings that are created in the change set artifact.

When Yes results in step 1314, the process shown in FIG. 13 determines if the current version in the target is not null (step 1326). When a Yes result is received in step 1326, there is a conflict (step 1320) (as this assumes a version mapping for the same concept was created in the stream after we created our change set). When a No result is received in step 1326, the target also does not have a version mapping for this concept and there is no conflict (step 1318) and the process moves to step 1322 as before. When a No result is received from step 1314, the process determines whether the previous version in the source stream is not the same as the version in the target stream and that the version mapping in the target is newer than the previous version mapping in the source stream (step 1316). When a Yes result is received, there is conflict (step 1320). When a No result is received in step 1316, there is no conflict (step 1318) and the process moves to step 1322 as before. The determination in step 1316 can be rephrased in an alterative determination of given previous source and current target versions are not the same, let a creation time of the version mapping in the target be Tt, and a creation time of the previous mapping in the source, be Ts. If Tt>Ts, there is a conflict. This may be shown in the following example with reference to FIG. 14 in which a textual representation of creating and committing a change set operable for various embodiments of the disclosure is presented.

Figure 14:
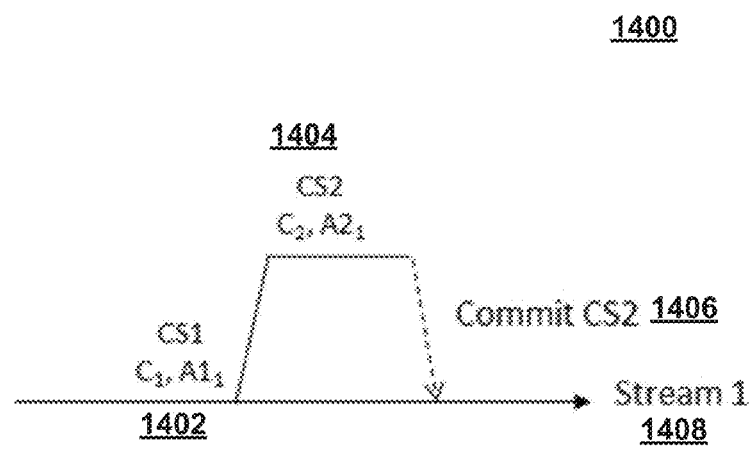
FIG. 14 is a textual representation of creating and committing a change set operable for various embodiments of the disclosure.

FIG. 14 represents, an example of, creating and committing change set CS2 1404, shown as result of an operation, commit CS2 1406 back into Stream 1 1408. In this case Tt and Ts are the same, and represent a time a user created C1. Therefore, there will never be a conflict.

Figure 15:
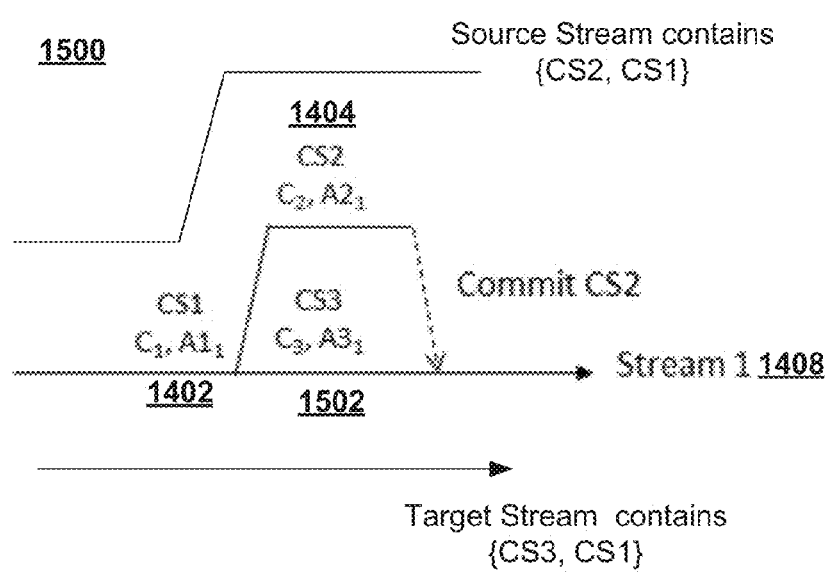
FIG. 15 is a textual representation of creating and committing a change set operable for various embodiments of the disclosure.

With reference to FIG. 15 in which a textual representation of creating and committing a change set operable for various embodiments of the disclosure is presented. FIG. 15 represents another scenario in which another user has committed a change set CS3 1502 in Stream 1 1408 before the user was able to deliver CS2 1404. In this case, Ts is the creation time of C1 1402, and Tt is the creation time of C3 1502. It is known C3 1502 was created after C1 1402 and therefore Tt>Ts, which implies a conflict, unless C3 1502 is identified as an ignorable version mapping for conflict detection by having the 'ignore' flag set.

Figure 16:
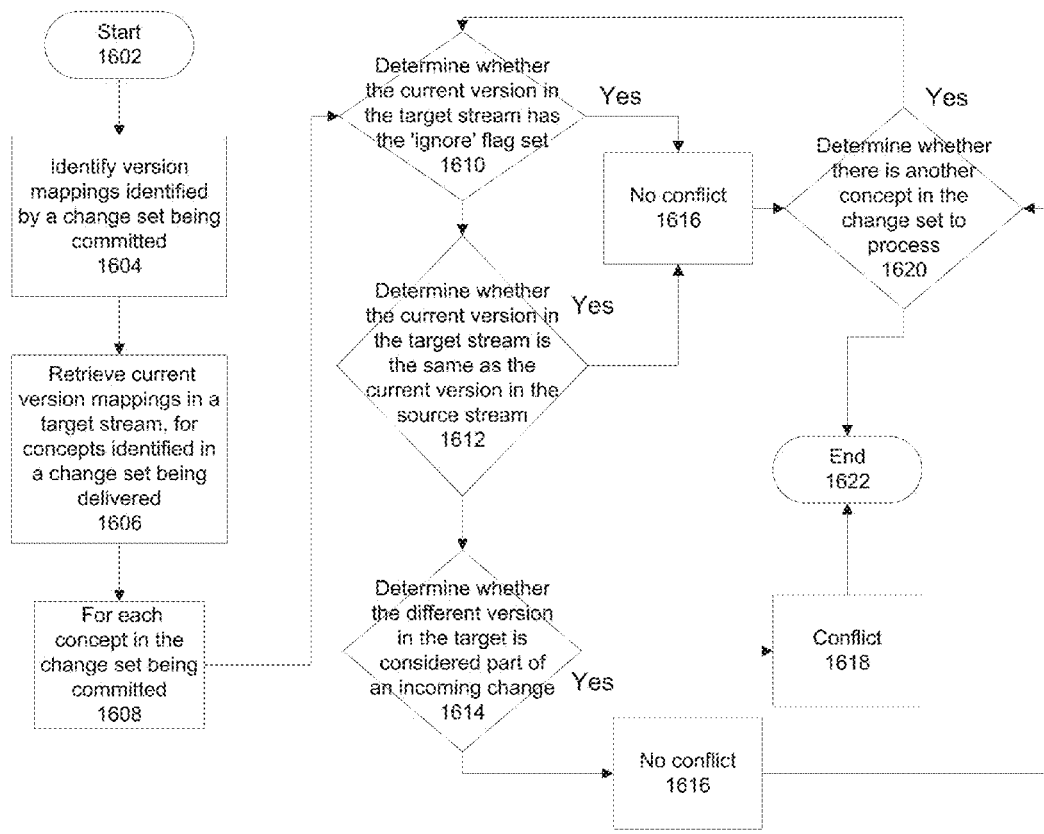
FIG. 16 is a flowchart of delivering a change set operable for various embodiments of the disclosure.

With reference to FIG. 16 a flowchart of delivering a change set operable for various embodiments of the disclosure is presented. The process shown in FIG. 16 is an example of a process of a domain tool used in delivering a change set between streams in consideration of detecting a conflict using change sets. The process assumes a change set is already committed in a stream and the change set is being delivered to a different stream.

The process shown in FIG. 16 begins (step 1602) and identifies version mappings identified by the change set being committed (step 1604). The process retrieves current version mappings in the target stream, for the concepts identified in the change set being delivered (step 1606). For each concept in the change sets being delivered (step 1608) the process determines whether the current version in the target has the 'ignore' flag set (step 1610). When a Yes result is received, there is no conflict (step 1616) and the process determines whether there is another concept in the change set to process (step 1620). When a Yes result is received, results from step 1620, the process will return to step 1610, otherwise the process terminates thereafter (step 1622). When a No result is received in step 1610, the process determines whether the current version in the target is the same as the current version in the source (step 1612). When Yes results from step 1612, there is no conflict (step 1616) and the process determines whether there is another concept in the change set to process (step 1620). When a Yes is returned from step 1620, the process shown in FIG. 16 returns to step 1610, otherwise it terminates thereafter (step 1622). When a No result is returned from step 1612, the process determines whether the different version in the target is considered part of an incoming change (step 1614). When a Yes result is returned in step 1614 there is a conflict (step 1618) and the process terminates thereafter (step 1622). When a No results is returned in step 1614, there is no conflict (step 1616) and the process determines whether there is another concept in the change set to process (step 1620) as before. A merge gap dependency identification process for a Change set is also changed in a similar way. A typical configuration management system identifies merge gap dependent change sets by inspecting version mappings associated with a time linear progression of change sets and marking any version mappings which have common artifacts identified. In this way, using the 'ignore' flag on a version mapping allows a domain tool to mark certain artifacts to be 'ignored' during processing.

Use of the 'ignore' flag in a process for delivering change sets, the meaning of which the flag applies to whether a next change set can assume a dependency based on a respective change. This capability enables tools to indicate newly created artifacts, as always, represent a dependency. Some tools cannot easily (for example, in a scalable or an efficient manner) possess knowledge at a time of creating a second change set, whether a previous version was one of a creation or a modification of a given artifact. Therefore, setting the 'ignore' flag on the version mapping to determine the behavior of the next change set enables tools to set this mapping when the tool is creating the artifact for the first time.

For example, with reference to the previously described FIG. 8, a domain tool that wants to have CS0 602 always be delivered when future change sets affect container C, but allow CS1 604 and CS3 802 to be delivered independently. The request can be accomplished in the following manner: the domain tool creates CS0 602 but does not flag C1 as 'ignored.' The domain tool creates CS1 604 and does flag C2 as 'ignored.' The domain tool creates CS3 802 and does flag C3 as 'ignored.'

Figure 17:
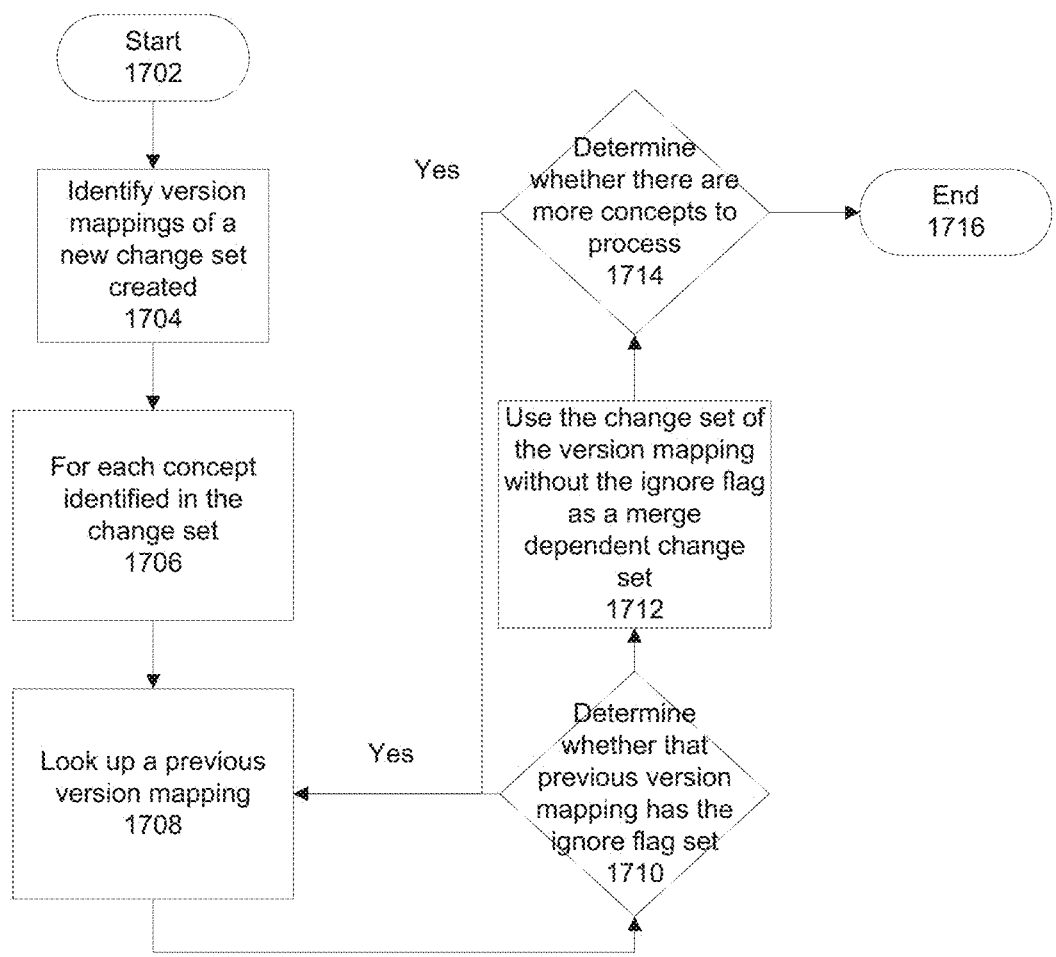
FIG. 17 is a flowchart of identifying change set dependencies for the purpose of merge gaps operable for various embodiments of the disclosure.

With reference now to FIG. 17 a flowchart of identifying change set dependencies for the purpose of merge gaps operable for various embodiments of the disclosure is presented. The process shown in FIG. 17 is an example of a record-based configuration management system process identifying change set dependencies for merge gaps. The process begins (step 1702) and identifies version mappings of the new change set that has been created (step 1704). For each concept identified in the change set, (step 1706). The process looks up a previous version mapping (step 1708). The process determines whether that previous version mapping has the 'ignore' flag set (step 1710). When a Yes result is received, the process loops back to perform step 1708 again. In looping back, the process is following a history chain of a single concept to find a mapping that is not ignored, and is not moving to a next concept. When a No result is received, the process uses the change set of the version mapping without the ignore flag as a merge dependent change set (step 1712). The process then determines if there are more concepts to process (step 1714), when the result is Yes the process loops back to step 1708 for the next concept, and when the result is No for step 1714, the process terminates thereafter (step 1716).

Using the example of process shown in FIG. 17, the following information is known using elements as previously referenced in FIG. 8: CS0 602 has no merge gap dependency; CS1 604 has a merge gap dependency to CS0 602 and CS3 802 has a merge gap dependency to CS0 602. In this way, CS3 802 can be delivered without CS1 604, and CS1 604 can be delivered without CS3 802. However both CS1 604 and CS3 802 must be delivered with CS0 602, when CS0 602 is not logically in the target stream already.

Figure 18:
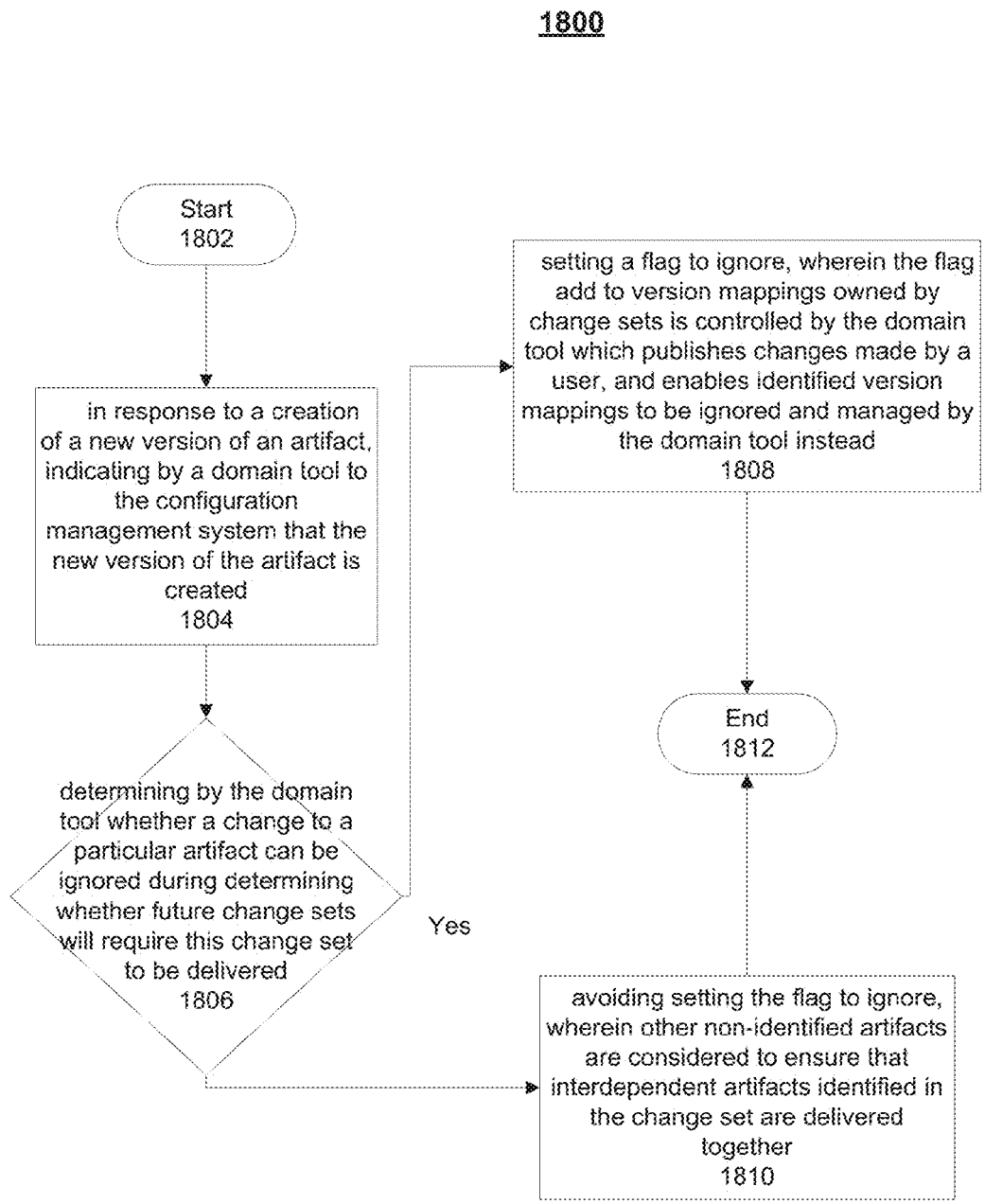
FIG. 18 is a flowchart of a process for extensible change set conflict and merge gap detection operable for various embodiments of the disclosure.

With reference now to FIG. 18 a flowchart of a process 1800 for extensible change set conflict and merge gap detection operable for various embodiments of the disclosure is presented. Process 1800 is an example of process for extensible change set conflict and merge gap detection in a record-based configuration management system. The record-based configuration management system includes components comprising a set of artifacts in a delivery and change management system comprising a stream artifact, including a unique identifier of a configuration and an identifier of a user who created the stream; a change set artifact, including a unique identifier of a change set and a reference to a stream in which the change set was created; a version mapping artifact, including a unique identifier of a version mapping and an identifier of a user who created the version mapping; a delivered change artifact, wherein the delivered change artifact tracks logically delivered change sets.

Process 1800 begins (step 1802). In response to a creation of a new version of an artifact, process 1800 indicates, by a domain tool, to the configuration management system that a new version of the artifact is created (step 1804).

Process 1800 determines, by the domain tool, whether a change to a particular artifact can be ignored during determining whether future change sets will require this change set to be delivered (step 1806). In response to a determination the change to the particular artifact can be ignored during determining whether future change sets will require this change set to be delivered, process 1800 sets a flag to 'ignore,' wherein the flag added to version mappings owned by change sets is controlled by the domain tool which publishes changes made by a user, and enables identified version mappings to be ignored and managed by the domain tool instead (step 1808).

In response to a determination the change to the particular artifact can not be ignored during determining whether future change sets will require this change set to be delivered, process 1800 avoids setting the flag to 'ignore,' wherein other non-identified artifacts are considered to ensure that interdependent artifacts identified in the change set are delivered together (step 1810) and process 1800 terminates thereafter (step 1812).

Thus is provided in at least one example of an embodiment of the invention for which protection is sought, a computer-implemented process for extensible change set conflict and merge gap detection in a record-based configuration management system. The computer-implemented process instructing the record-based configuration management system to create a change set. The computer-implemented process also instructing the record-based configuration management system to add one or more version mappings to a given configuration and indicate specific concepts which should be flagged as not participating in conflict/merge gap detection and further instructing the record-based configuration management system to deliver the change set, typically at a request of a user.

Thus is provided in at least one example of an embodiment of the invention for which protection is sought, a computer-implemented process for extensible change set conflict and merge gap detection in a record-based configuration management system. The computer-implemented process comprising in response to a creation of a new version of an artifact, the computer-implemented process indicating, by a domain tool to the configuration management system, that the new version of the artifact is created. The computer-implemented process further determining, by the domain tool, whether a change to a particular artifact can be ignored during determining whether future change sets will require this change set to be delivered. In response to a determination the change to the particular artifact can be ignored during determining whether future change sets will require this change set to be delivered, the computer-implemented process setting a flag to ignore, wherein the flag added to version mappings owned by change sets is controlled by the domain tool which publishes changes made by a user, and enables identified version mappings to be ignored and managed by the domain tool instead. In response to a determination the change to the particular artifact can not be ignored during determining whether future change sets will require this change set to be delivered, the computer-implemented process avoiding setting the flag to ignore, wherein other non-identified artifacts are considered to ensure that interdependent artifacts identified in the change set are delivered together.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for extensible change set conflict and merge gap detection in a record-based configuration management system, the method comprising:

instructing the record-based configuration management system to create a change set, wherein the record-based configuration management system comprises a set of artifacts in a delivery and change management system comprising a change set artifact, including a unique identifier of a change set and a reference to a stream in which the change set was created; and a version mapping artifact, including a unique identifier of a version mapping and an identifier of a user who created the version mapping;

instructing the record-based configuration management system to add one or more version mappings to a given configuration and to indicate specific concepts which should be flagged as not participating in a process that includes change set conflict and merge gap detection;

instructing the record-based configuration management system to deliver the change set to a requestor;

identifying version mappings identified by a change set being committed;

retrieving current version mappings in a target stream, for concepts identified in the change set being delivered; and for each concept in the change set being delivered:
determining whether a current version in the target stream has an ignore flag set;

in response to a determination the current version in the target stream has the ignore flag set, indicating no conflict;

in response to a determination the current version in the target stream does not have the ignore flag set, determining whether the current version in the target stream is the same as a current version in the change set;

in response to a determination the current version in the target stream is the same as the current version in the change set indicating no conflict;

in response to a determination the current version in the target stream is not the same as the current version in the change set determining whether there is no previous version mapping for a concept in the source stream before the change set was created;

in response to a determination there is no previous version mapping for a concept in the source stream before the change set was created, indicating a conflict;

in response to a determination there is a previous version mapping for a concept in the source stream before the change set was created, determining whether the version in the change set is not the same as the version in the target stream and the current version in the target stream is newer than the previous version of the version mapping in the change set; and in response to a determination the version in the change set is not the same as the version in the target stream and the current version in the target stream is newer than the previous version of the version mapping in the change set, indicating a conflict.

2. The method of claim 1, further comprising:

in response to a creation of a new version of an artifact, indicating by a domain tool to the record-based configuration management system that the new version of the artifact is created and setting a meta-property of a version mapping artifact in the record-based configuration management system;

determining by the domain tool whether a change to a particular artifact can be ignored during a determining of whether future change sets will require this change set to be delivered;

in response to a determination that the change to the particular artifact can be ignored during the determining of whether future change sets will require this change set to be delivered, setting a flag to ignore, wherein the flag is added to version mappings owned by change sets and controlled by the domain tool which publishes changes made by a user, and enables identified version mappings to be ignored and managed by the domain tool instead; and in response to a determination that the change to the particular artifact can not be ignored during the determining of whether future change sets will require this change set to be delivered, avoiding setting the flag to ignore, wherein other non-identified artifacts are considered to ensure that interdependent artifacts identified in the change set are delivered together.

3. The method of claim 1, further comprising:

identifying version mappings of a new change set created; and for each concept in the change set being delivered:
look up a previous version mapping;
determine whether that previous version mapping has an ignore flag set;
in response to a determination the ignore flag is set returning to look up the previous version mapping; and
in response to a determination the ignore flag is not set, using the change set of the version mapping without the ignore flag as a merge dependent change set.

4. A computer program product for extensible change set conflict and merge gap detection in a record-based configuration management system, the computer program product comprising a computer readable storage medium having program instructions embodied therewith, the program instructions executable by a processor to cause the processor to perform:

instructing the record-based configuration management system to create a change set, wherein the record-based configuration management system comprises a set of artifacts in a delivery and change management system comprising a change set artifact, including a unique identifier of a change set and a reference to a stream in which the change set was created; and a version mapping artifact, including a unique identifier of a version mapping and an identifier of a user who created the version mapping;

instructing the record-based configuration management system to add one or more version mappings to a given configuration and to indicate specific concepts which should be flagged as not participating in a process that includes change set conflict and merge gap detection;
instructing the record-based configuration management system to deliver the change set to a requestor;
identifying version mappings identified by a change set being committed;
retrieving current version mappings in a target stream, for concepts identified in the change set being delivered; and
for each concept in the change set being delivered:
  determining whether a current version in the target stream has an ignore flag set;
  in response to a determination the current version in the target stream has the ignore flag set, indicating no conflict;
  in response to a determination the current version in the target stream does not have the ignore flag set, determining whether the current version in the target stream is the same as a current version in the change set;
  in response to a determination the current version in the target stream is the same as the current version in the change set indicating no conflict;
  in response to a determination the current version in the target stream is not the same as the current version in the change set determining whether there is no previous version mapping for a concept in the source stream before the change set was created;
  in response to a determination there is no previous version mapping for a concept in the source stream before the change set was created, indicating a conflict;
  in response to a determination there is a previous version mapping for a concept in the source stream before the change set was created, determining whether the version in the change set is not the same as the version in the target stream and the current version in the target stream is newer than the previous version of the version mapping in the change set; and
  in response to a determination the version in the change set is not the same as the version in the target stream and the current version in the target stream is newer than the previous version of the version mapping in the change set, indicating a conflict.

5. The computer program product of claim 4, wherein the program instructions executable by a processor further cause the processor to perform:
  in response to a creation of a new version of an artifact, indicating by a domain tool to the configuration management system that the new version of the artifact is created and setting a meta-property of a version mapping artifact in the system;
  determining by the domain tool whether a change to a particular artifact can be ignored during determining whether future change sets will require this change set to be delivered;
  in response to a determination the change to the particular artifact can be ignored during determining whether future change sets will require this change set to be delivered, setting a flag to ignore, wherein the flag added to version mappings owned by change sets is controlled by the domain tool which publishes changes made by a user, and enables identified version mappings to be ignored and managed by the domain tool instead; and
  in response to a determination the change to the particular artifact can not be ignored during determining whether future change sets will require this change set to be delivered, avoiding setting the flag to ignore, wherein other non-identified artifacts are considered to ensure that interdependent artifacts identified in the change set are delivered together.

6. The computer program product of claim 4, wherein the program instructions executable by a processor further cause the processor to perform:
  identifying version mappings of a new change set created; and
  for each concept in the change set being delivered:
    look up a previous version mapping;
      determine whether that previous version mapping has an ignore flag set;
      in response to a determination the ignore flag is set returning to look up the previous version mapping; and
      in response to a determination the ignore flag is not set, using the change set of the version mapping without the ignore flag as a merge dependent change set.

7. An apparatus for extensible change set conflict and merge gap detection in a record-based configuration management system, the apparatus comprising:
  a memory having computer readable instructions; and
  a processor for executing the computer readable instructions, the computer readable instructions comprising:
  instructing the record-based configuration management system to create a change set, wherein the record-based configuration management system comprises a set of artifacts in a delivery and change management system comprising a change set artifact, including a unique identifier of a change set and a reference to a stream in which the change set was created; and a version mapping artifact, including a unique identifier of a version mapping and an identifier of a user who created the version mapping;
  instructing the record-based configuration management system to add one or more version mappings to a given configuration and to indicate specific concepts which should be flagged as not participating in a process that includes change set conflict and merge gap detection;
  instructing the record-based configuration management system to deliver the change set to a requestor;
  identifying version mappings identified by a change set being committed;
  retrieving current version mappings in a target stream, for concepts identified in the change set being delivered; and
  for each concept in the change set being delivered:
    determining whether a current version in the target stream has an ignore flag set;
    in response to a determination the current version in the target stream has the ignore flag set, indicating no conflict;
    in response to a determination the current version in the target stream does not have the ignore flag set, determining whether the current version in the target stream is the same as a current version in the change set;
    in response to a determination the current version in the target stream is the same as the current version in the change set indicating no conflict;
    in response to a determination the current version in the target stream is not the same as the current version in the change set determining whether there is no previous version mapping for a concept in the source stream before the change set was created;

in response to a determination there is no previous version mapping for a concept in the source stream before the change set was created, indicating a conflict;

in response to a determination there is a previous version mapping for a concept in the source stream before the change set was created, determining whether the version in the change set is not the same as the version in the target stream and the current version in the target stream is newer than the previous version of the version mapping in the change set; and in response to a determination the version in the change set is not the same as the version in the target stream and the current version in the target stream is newer than the previous version of the version mapping in the change set, indicating a conflict.

8. The apparatus of claim 7, wherein the processor executes the computer executable program code to further direct the apparatus to:

in response to a creation of a new version of an artifact, indicate by a domain tool to the configuration management system that the new version of the artifact is created and setting a meta-property of a version mapping artifact in the system;

determine by the domain tool whether a change to a particular artifact can be ignored during determining whether future change sets will require this change set to be delivered;

in response to a determination the change to the particular artifact can be ignored during determining whether future change sets will require this change set to be delivered, set a flag to ignore, wherein the flag added to version mappings owned by change sets is controlled by the domain tool which publishes changes made by a user, and enables identified version mappings to be ignored and managed by the domain tool instead; and in response to a determination the change to the particular artifact can not be ignored during determining whether future change sets will require this change set to be delivered, avoid setting the flag to ignore, wherein other non-identified artifacts are considered to ensure that interdependent artifacts identified in the change set are delivered together.

9. The apparatus of claim 7, wherein the processor executes the computer executable program code to further direct the apparatus to:

identify version mappings of a new change set created; and for each concept in the change set being delivered:
look up a previous version mapping;
determine whether that previous version mapping has an ignore flag set;
in response to a determination the ignore flag is set, return to look up the previous version mapping; and
in response to a determination the ignore flag is not set, use the change set of the version mapping without the ignore flag as a merge dependent change set.

* * * * *